US011770277B2

(12) United States Patent
Keating et al.

(10) Patent No.: US 11,770,277 B2
(45) Date of Patent: Sep. 26, 2023

(54) TRANSMITTER RESIDUAL CARRIER FREQUENCY OFFSET COMPENSATION

(71) Applicant: NOKIA TECHNOLOGIES OY, Espoo (FI)

(72) Inventors: Ryan Keating, Chicago, IL (US); Oana-Elena Barbu, Aalborg (DK); Benny Vejlgaard, Gistrup (DK); Johannes Harrebek, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/221,655

(22) Filed: Apr. 2, 2021

(65) Prior Publication Data

US 2022/0321388 A1    Oct. 6, 2022

(51) Int. Cl.
*H04L 27/00* (2006.01)
*H04L 5/00* (2006.01)
*H04L 27/26* (2006.01)

(52) U.S. Cl.
CPC ........ *H04L 27/0014* (2013.01); *H04L 5/0051* (2013.01); *H04L 27/2675* (2013.01); *H04L 2027/0026* (2013.01)

(58) Field of Classification Search
CPC ............... H04L 27/0014; H04L 5/0051; H04L 27/2675; H04L 2027/0026
See application file for complete search history.

(56) References Cited

U.S. PATENT DOCUMENTS

| 10,660,109 B2* | 5/2020 | Bitra ............... H04L 5/0091 |
| 2015/0029874 A1 | 1/2015 | Davydov et al. |
| 2015/0215884 A1 | 7/2015 | Horvat et al. |
| 2016/0127955 A1 | 5/2016 | Damnjanovic et al. |
| 2018/0338256 A1 | 11/2018 | Fodor et al. |
| 2019/0246244 A1* | 8/2019 | Rico Alvarino ...... H04L 5/0092 |

(Continued)

FOREIGN PATENT DOCUMENTS

| EP | 3053390 A1 | 8/2016 |
| EP | 3944680 A1 | 1/2022 |

(Continued)

OTHER PUBLICATIONS

Wenjin Wang et al., "Near Optimal Timing and Frequency Offset Estimation for 5G Integrated LEO Satellite Communication System", IEEE Access, vol. 7, 2019, Special Section on new Waveform Design and Air-Interface for Future Heterogeneous Network Towards 5G, published Aug. 13, 2019, Digital Object Identifier 10.1109/ACCESS.2019.2935038, 13 pages.

(Continued)

*Primary Examiner* — Kabir A Timory
(74) *Attorney, Agent, or Firm* — SQUIRE PATTON BOGGS (US) LLP

(57) ABSTRACT

Systems, methods, apparatuses, and computer program products for transmitter residual carrier frequency offset compensation. The method may include receiving, at a reference user equipment, configuration for a positioning reference measurement from a network element. The method may also include estimating a transmission carrier frequency offset of the network element based on the positioning reference measurements. The method may further include transmitting the estimated transmission carrier frequency offset in a report to the network element.

18 Claims, 7 Drawing Sheets

(56) References Cited

U.S. PATENT DOCUMENTS

| | | | |
|---|---|---|---|
| 2019/0306825 A1* | 10/2019 | Lindskog | H04W 24/08 |
| 2020/0067740 A1 | 2/2020 | Breiling et al. | |
| 2020/0068469 A1* | 2/2020 | Sathe | H04W 36/14 |
| 2021/0360570 A1* | 11/2021 | Manolakos | G01S 1/0428 |
| 2022/0369270 A1* | 11/2022 | Jiang | H04L 5/0048 |

FOREIGN PATENT DOCUMENTS

| | | |
|---|---|---|
| WO | 2015/048644 A1 | 4/2015 |
| WO | 2020/186959 A1 | 9/2020 |

OTHER PUBLICATIONS

Xiupei Zhang et al., "Suppression of synchronization errors in OFDM based carrier aggregation system", IEEE.org, https://ieeexplore.ieee.org/document/5679745, 3 pages, published 2010 16th Asia-Pacific Conference on Communications (APCC), DOI: 10.1109/APCC.2010.5679745.

Qualcomm Incorporated, "Potential Positioning Enhancements for NR Rel-17 Positioning", 3GPP TSG RAN WG1 #103-e, 3-Meeting, Oct. 26-Nov. 13, 2020, R1-2008619, 17 pages.

Nokia, Nokia Shanghai Bell, "Future Handling of NR Enhanced Positioning", 3GPP TSG RAN Meeting #91e, Electronic Meeting, Mar. 16-26, 2021, RP-210242, 4 pages.

International Search Report and Written Opinion issued in corresponding International Application No. PCT/EP2022/056982 dated Jul. 2, 2022.

\* cited by examiner

TRANSMITTER RESIDUAL CARRIER FREQUENCY OFFSET COMPENSATION

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for transmitter residual carrier frequency offset compensation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR technology and named NG-eNB when built on E-UTRAN radio.

SUMMARY

Some example embodiments may be directed to a method. The method may include receiving configuration for a positioning reference measurement from a network element. The method may also include estimating a transmission carrier frequency offset of the network element based on the positioning reference measurements. The method may further include transmitting the estimated transmission carrier frequency offset in a report to the network element.

Other example embodiments may be directed to an apparatus. The apparatus may include at least one processor and at least one memory including computer program code. The at least one memory and computer program code may also be configured to, with the at least one processor, cause the apparatus at least to receive configuration for a positioning reference measurement from a network element. The apparatus may also be caused to estimate a transmission carrier frequency offset of the network element based on the positioning reference measurements. The apparatus may further be caused to transmit the estimated transmission carrier frequency offset in a report to the network element.

Other example embodiments may be directed to an apparatus. The apparatus may include means for receiving configuration for a positioning reference measurement from a network element. The apparatus may also include means for estimating a transmission carrier frequency offset of the network element based on the positioning reference measurements. The apparatus may further include means for transmitting the estimated transmission carrier frequency offset in a report to the network element.

In accordance with other example embodiments, a non-transitory computer readable medium may be encoded with instructions that may, when executed in hardware, perform a method. The method may include receiving configuration for a positioning reference measurement from a network element. The method may also include estimating a transmission carrier frequency offset of the network element based on the positioning reference measurements. The method may further include transmitting the estimated transmission carrier frequency offset in a report to the network element.

Other example embodiments may be directed to a computer program product that performs a method. The method may include measuring, at a network node, a radio altimeter signal. The method may also include receiving configuration for a positioning reference measurement from a network element. The method may also include estimating a transmission carrier frequency offset of the network element based on the positioning reference measurements. The method may further include transmitting the estimated transmission carrier frequency offset in a report to the network element.

Other example embodiments may be directed to an apparatus that may include circuitry configured to measure, at the apparatus, a radio altimeter signal. The apparatus may also include circuitry configured to receive configuration for a positioning reference measurement from a network element. The apparatus may also include circuitry configured to estimate a transmission carrier frequency offset of the network element based on the positioning reference measurements. The apparatus may further include circuitry configured to transmit the estimated transmission carrier frequency offset in a report to the network element.

Certain example embodiments may be directed to a method. The method may include configuring a reference user equipment for a positioning reference measurement. The method may also include receiving, from the reference user equipment, a report including an estimated transmission carrier frequency offset. The method may further include transmitting the estimated transmission carrier frequency offset to a target user equipment.

Other example embodiments may be directed to an apparatus. The apparatus may include at least one processor and at least one memory including computer program code. The at least one memory and computer program code may be configured to, with the at least one processor, cause the apparatus at least to configure a reference user equipment for a positioning reference measurement. The apparatus may also be configured to receive, from the reference user equipment, a report including an estimated transmission carrier frequency offset. The apparatus may further be configured to transmit the estimated transmission carrier frequency offset to a target user equipment.

Other example embodiments may be directed to an apparatus. The apparatus may include means for configuring a reference user equipment for a positioning reference measurement. The apparatus may also include means for receiving, from the reference user equipment, a report including an estimated transmission carrier frequency offset. The apparatus may further include means for transmitting the estimated transmission carrier frequency offset to a target user equipment.

In accordance with other example embodiments, a non-transitory computer readable medium may be encoded with instructions that may, when executed in hardware, perform a method. The method may include configuring a reference user equipment for a positioning reference measurement. The method may also include receiving, from the reference user equipment, a report including an estimated transmission carrier frequency offset. The method may further include transmitting the estimated transmission carrier frequency offset to a target user equipment.

Other example embodiments may be directed to a computer program product that performs a method. The method may include configuring a reference user equipment for a positioning reference measurement. The method may also include receiving, from the reference user equipment, a report including an estimated transmission carrier frequency offset. The method may further include transmitting the estimated transmission carrier frequency offset to a target user equipment.

Other example embodiments may be directed to an apparatus that may include circuitry configured to configure a reference user equipment for a positioning reference measurement. The apparatus may also include circuitry configured to receive, from the reference user equipment, a report including an estimated transmission carrier frequency offset. The apparatus may further include circuitry configured to transmit the estimated transmission carrier frequency offset to a target user equipment.

Certain example embodiments may be directed to a method. The method may include receiving assistance data including an estimated transmission carrier frequency offset from a network element. The method may also include jointly measuring carrier aggregation timing measurements for positioning based on the estimated transmission carrier frequency offset.

Other example embodiments may be directed to an apparatus. The apparatus may include at least one processor and at least one memory including computer program code. The at least one memory and computer program code may also be configured to, with the at least one processor, cause the apparatus at least to receive assistance data including an estimated transmission carrier frequency offset from a network element. The apparatus may also be caused to jointly measure carrier aggregation timing measurements for positioning based on the estimated transmission carrier frequency offset.

Other example embodiments may be directed to an apparatus. The apparatus may include means for receiving assistance data including an estimated transmission carrier frequency offset from a network element. The apparatus may also include means for jointly measuring carrier aggregation timing measurements for positioning based on the estimated transmission carrier frequency offset.

In accordance with other example embodiments, a non-transitory computer readable medium may be encoded with instructions that may, when executed in hardware, perform a method. The method may include receiving assistance data including an estimated transmission carrier frequency offset from a network element. The method may also include jointly measuring carrier aggregation timing measurements for positioning based on the estimated transmission carrier frequency offset.

Other example embodiments may be directed to a computer program product that performs a method. The method may include receiving assistance data including an estimated transmission carrier frequency offset from a network element. The method may also include jointly measuring carrier aggregation timing measurements for positioning based on the estimated transmission carrier frequency offset.

Other example embodiments may be directed to an apparatus that may include circuitry configured to receive assistance data including an estimated transmission carrier frequency offset from a network element. The apparatus may also include circuitry configured to jointly measure carrier aggregation timing measurements for positioning based on the estimated transmission carrier frequency offset.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for transmitter residual carrier frequency offset compensation for carrier aggregated user equipment positioning.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

$3^{rd}$ Generation Partnership Project (3GPP) describes solutions to enable radio access technology (RAT) dependent (for both FR1 and FR2) and RAT independent NR positioning enhancements for improving positioning accuracy, latency, network and/or device efficiency. Certain objectives of 3GPP specify methods, measurements, signaling, and procedures for improving positioning accuracy of Rel-16 positioning methods by mitigating user equipment (UE) Rx/Tx and/or gNB Rx/Tx timing delays. Examples include downlink (DL), uplink (UL), and DL+UL positioning methods. Other examples may include UE-based and UE-assisted positioning solutions.

RAN1 centric objectives may also specify procedures, measurements, reporting, and signaling for improving the accuracy of RAN1. Examples in this regard may include UL angle of arrival (AoA) for network-based positioning solutions, and DL angle of departure (AoD) for UE-based and network-based (including EU-assisted) positioning solutions.

Certain enhancements have been considered to improve positioning accuracy, reducing latency, improving network, and/or device efficiency. For example, one enhancement may include simultaneous transmission by the gNB and aggregated reception by the UE of intra-band one or more contiguous carriers in one or more contiguous positioning frequency layers (PFLs). Another enhancement may include simultaneous transmission by the UE and aggregated reception by the gNB of the sounding reference signal (SRS) for positioning in multiple contiguous intra-band carriers.

Figure 1:
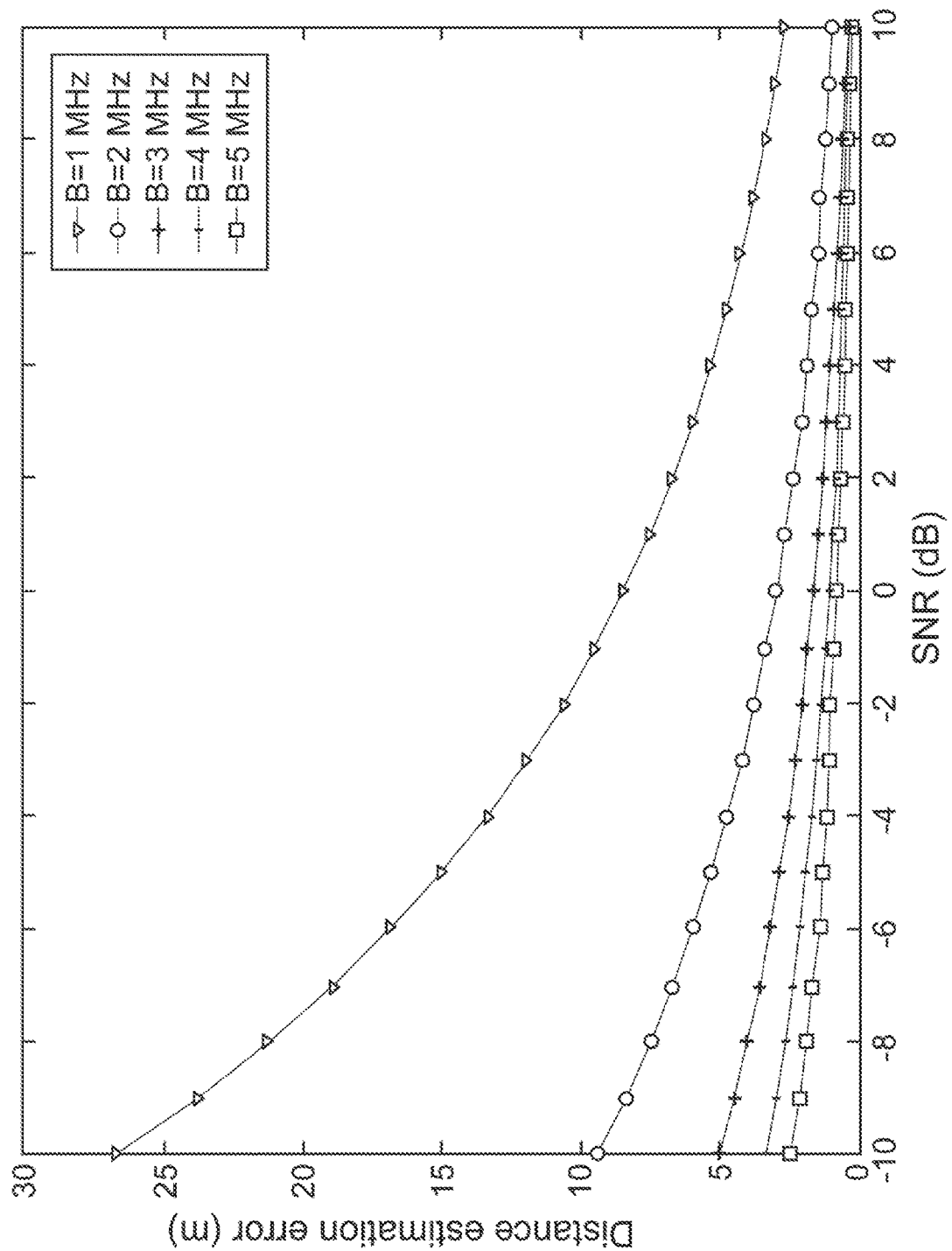
FIG. 1 illustrates an example of the effect of bandwidth and signal to noise ratio (SNR) on time-of-arrival (ToA) ranging error.

FIG. 1 illustrates an example of the effect of bandwidth and signal to noise ratio (SNR) on time-of-arrival (ToA) ranging error. A challenge for cellular based positioning accuracy may be the limited bandwidth available. In this regard, FIG. 1 illustrates the best achievable performance for TOA-based ranging in a multipath-free channel in terms of bandwidth and SNR based on simulation. As can be seen in FIG. 1, higher SNR and wider bandwidth result in more accurate ranging. Thus, having a large bandwidth may be an essential aspect to achieving high accuracy.

Figure 2:
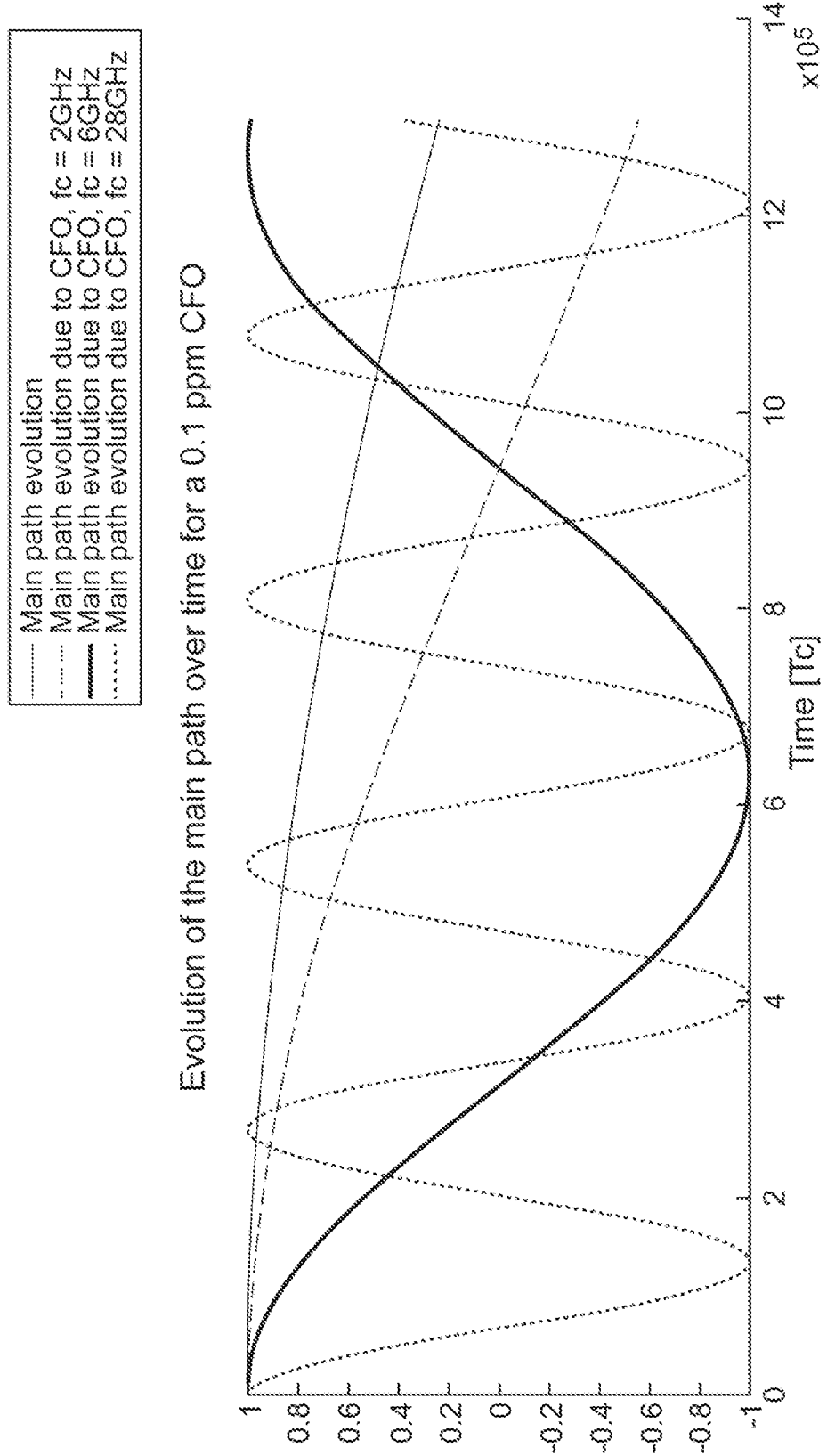
FIG. 2 illustrates an example evolution of the main path over time for 0.1 ppm carrier frequency offset.

FIG. 2 illustrates an example evolution of the main path over time for 0.1 ppm CFO. In particular, carrier frequency offset (CFO) may affect a baseband receiver design and the TOA acquisition since the receiver may include the CFO in the channel impulse response (CIR) estimation as the natural evolution of the multipath channel over time as shown in FIG. 2. Furthermore, the CFO may be defined as the mismatch between the transmit carrier frequency, $f_{TX}$, and received carrier frequency $f_{RX}$, as seen by the receiver. The mismatch (i.e., CFO ($f_{TX}-f_{RX}$)) may be caused by imperfect Tx and Rx oscillators and Doppler effects, and may introduce intercarrier interference when demodulating the received signal. In the time domain, the CFO's effect may appear as an amplitude reduction and phase shift of any given multipath component as shown in FIG. 2.

In view of the above, certain challenges may exist in how to extend the positioning receiver functionality when operating in a carrier aggregation (CA) mode. Thus, certain example embodiments seek to resolve how to efficiently combine the multiple carriers in the UE, including the effects from different CFOs. CFOs may be partially calibrated at the transmitter side (e.g., based on lab characterization). Certain example embodiments focus on residual CFO errors, which may occur in practice due to time varying CFO effects and/or cheaper implementations. One example of such a scenario is an operator that has limited bandwidth available in some frequency bands and takes advantage of CA with a low complexity implementation of CA. According to certain example embodiments, for positioning the level of CFO, compensation may need to be much higher than for data communications due to strict positioning requirements (e.g., 20 cm).

Certain enhancements have been proposed to enable DL/UL position reference signal (PRS) bundling in frequency domain in both intra-band and inter-band scenarios within the same frequency range (FR). Although PRS may be a particular reference signal defined by 3GPP, certain example embodiments may apply generally to any reference signal used for positioning. Some signaling enhancements related to timing, phase, power offsets, and quasi-colocation (QCL) relations among the PRS resources of different PFLs from the same transmit receive point (TRP) have been provided. In addition, there have been enhancements related to measurement period, accuracy requirements, and UE capabilities for scenarios of coherent and concurrent processing of multiple PFLs from the same TRP. However, these enhancements do not provide any means by which 5G NR could enable such enhancements. Similarly, the more generic frequency offset issue has been highlighted, but there has not been any discussion as to any solutions for this issue. In addition, in relative frequency offset across component carriers (CCs), the signals propagating through the different transmit chains may have a non-zero relative frequency offset of $\Delta f \neq 0$, which may result in the subcarriers shift across CCs.

Certain example embodiments may provide a signaling framework through which a positioning receiver (UE in DL and TRP in UL) obtains (residual) CFO information introduced by the Tx when performing positioning-sounding reference signal (P-SRS) in CA mode. For instance, certain example embodiments may provide capability signaling between the UE and a location management function (LMF)/network to inform the LMF/network of the UE's ability to measure and/or compensate for residual TX CFO. According to certain example embodiments, different capability signaling may be introduced for reference UEs or for target UEs. For instance, in certain example embodiments, a reference UE may follow a different capability signaling procedure or have different capability messages compared with a target UE.

In certain example embodiments, the residual TX CFO may be measured between carriers at a reference UE (i.e., device with known location), and communicating the estimated TX CFO to the LMF. In some example embodiments, this step may involve configuring the reference UE for the measurements, and reporting the measurements from the reference UE to the LMF. For instance, in certain example embodiments, configuring the reference UE for the measurements may involve sending an LTE positioning protocol (LPP) message requesting certain measurements and providing the UE with the PRS configuration such that the UE may perform the requested measurements.

Certain example embodiments may also provide signaling the estimated residual TX CFO as additional assistance data from the LMF to target UEs, which may be configured for PRs measurement in CA mode (e.g., as part of a new LPP message). For instance, according to certain example embodiments, as part of the LMF determining the TX CFO, multiple reference UEs or other UEs may be asked to report on the TX CFO to crowdsource the final TX CFO determination.

In other example embodiments, the target UEs may apply the estimated TX CFO as part of their timing measurement procedure on PRS in CA mode to improve the timing estimation accuracy, and therefore improve the positioning accuracy.

According to certain example embodiments, a transmitter (e.g., TRP in DL, UE in UL) may use b=1:B bands to transmit on each band a positioning signal $u_b$ (t). This signal may be passed through a bandpass filter with a response, and upconverted to the carrier frequency $f_{c,b}$.

Certain example embodiments may relate to intra-band CA for P(S)RS (e.g., PRS/P-SRS)transmission. In this case, the B (e.g., a variable representing the number of frequency bands) transmit signals $v_b$ (t)=($u_b$)exp (j2π$f_{c,b}$t) may travel over a wireless channel with impulse response as shown in equation (1).

$$h(t) = \sum_{l=1:K} a_l \delta(t - \tau_l) \quad (1)$$

Equation (1) may include l=1:L multipath components, each with gain $\alpha\_1$ and delay $\tau\_1$, where for simplicity, it may be assumed that the delay vector $\tau=[\tau_1, \ldots \tau_L]$ is ordered in ascending order. Here, it may be assumed that the bands are close enough in frequency so that the channel impulse response (CIR) does not vary with a change in carrier.

At reception, after imperfect down-conversion from the carrier $f_{c,b}$, for example, $v_b$ (t) exp (−j(2π($f_{c,b}$+ξ)t)), and bandpass filtering, the b-th received signal may be represented as follows in equation (2).

$$y_b(t)=(\bar{h}*u_b)(t)+\epsilon(t), b=1:B \quad (2)$$

In equation (2), the CIR $\overline{h(t)}$=h exp(j2πξt), ξ being the CFO.

Other example embodiments may relate to inter-band CA for P(S)RS transmission. For instance, according to certain example embodiments, compared to the intra-band CA, an additional effect may appear in the received signal. Specifically, the down-conversion may introduce a random CFO $\xi_b$ at each carrier, so that the received signal in band b becomes:

$$y_b(t)=(\overline{h_b}*u_b)(t)+\epsilon(t), b=1:B \quad (3)$$

where the CIR $\overline{h_b(t)}$=h exp(j2π$\xi_b$t) and the CFOs $\xi_b$, ∀b=1: B, across carriers are independent and identically distributed.

According to certain example embodiments, in the case of intra-band CA for P(S)RS and inter-band CA for P(S)RS transmissions, a positioning receiver without knowledge of the B CFOs may not distinguish between the phase rotation due to multipath propagation and that of the TX-RX CFO, and, thus, may estimate $\overline{h_b(t)}$ instead of h, wrongly attributing the CFO effects to the propagation over multiple artificial paths with AOA biased by the unknown CFO.

In certain example embodiments, as part of supporting CA for positioning, 3GPP may introduce new signaling and assistance data. In some example embodiments, a new assistance data may be related to the TX CFO, which may be estimated by the network. For example, in the case of PRS transmission by the gNBs, there may be a reference UE/device that takes measurements to estimate the TX CFO of the gNBs. According to certain example embodiments, a reference UE may be a device with known location and capabilities to make positioning measurements. The known location may either be a fixed location (e.g., dedicated node is deployed), or an alternative positioning source (e.g., global navigation satellite system (GNSS)) which gives a highly accurate position. In other example embodiments, there may be capabilities specific to CFO estimation that may be introduced.

According to certain example embodiments, the assistance information measured by the reference UE may be conveyed to other target UEs through standardized signaling (e.g., from reference UE to LMF, and then LMF to target UE), and used by the latter to estimate the Rx CFO. For instance, the reference UE may measure the estimated TX CFO and report it to the LMF. The LMF may then include the estimated TX CFO as assistance data to other target UEs. According to some example embodiments, the target UE may then use the RX CFO to pre-compensate a future UL transmission of other positioning signals in the respective band (e.g., in the case of multi-round trip time (multi-RTT)). According to certain example embodiments, the pre-compensation may be achieved by applying a phase offset proportional to the RX CFO. For example, if the RX CFO is φ, then the signal may be offset in phase by a phase exp(−jφ).

Figure 3:
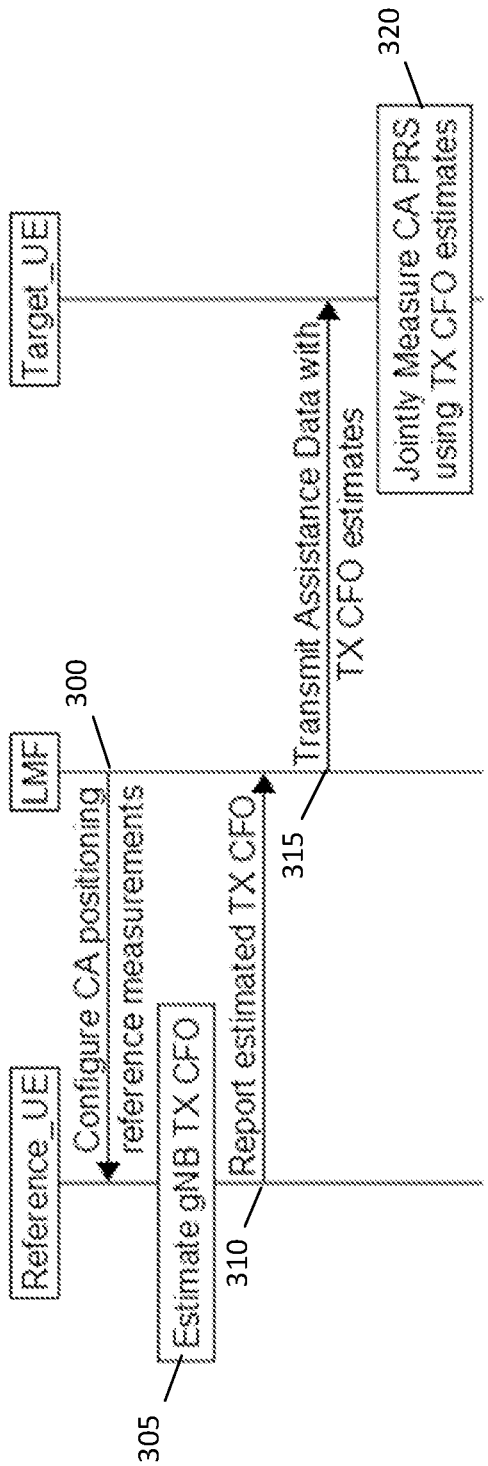
FIG. 3 illustrates an example signal flow of TX CFO assistance data, according to certain example embodiments.

FIG. 3 illustrates an example signal flow of TX CFO assistance data, according to certain example embodiments. At 300, the LMF may configure the reference UE for positioning reference measurements. For instance, in certain example embodiments, the LMF may request the reference UE to make positioning reference measurements (e.g., TX CFO). At 305, the reference UE may make reference measurements based on the received positioning reference measurements in the configuration, and use them to estimate the TX CFO of the gNBs. At 310, the reference UE may transmit a report of the estimated TX CFO to the LMF, and the LMF may, at 315, use received estimated TX CFO as assistance data for target UEs by transmitting the assistance data with the TX CFO estimates to the target UE. At 320, the target UE may jointly measure CA PRS using the TX CFO estimates. For example, the target UE may jointly measure the CA PRS by making a single measurement on the combined CA PRS (e.g., by frequency stitching). According to certain example embodiments, with the received TX CFO estimates, the target UEs may have better estimates of the TX CFO as part of PRS transmission from the TRPs, and the UEs may be able to use this information as part of the model described above.

As described above, in certain example embodiments, there may be capabilities that are specific to CFO estimation. For instance, according to certain example embodiments, UEs that support certain example embodiments may signal such capability to the network through the form of new signaling to the LMF/network. This may be as simple as a single capability bit to inform the network of the support of CFO compensation in CA positioning. Alternatively, this may include some reporting on the network of the support of CFO compensation in CA positioning or could include some reporting on the level of CFO components that the UE is able to perform. In certain example embodiments, this information related to the capabilities specific to CFO estimation may be useful for the LMF when it is determining which positioning technique may be suitable for meeting individual positioning quality of service (QoS). It may also be useful for the LMF when determining which carriers may be configured to the reference or target UE as part of CA. In some example embodiments, suitable positioning techniques may include multi-cell round trip time (multi-RTT), uplink angle of arrival (UL-AoA), downlink angle of departure (DL-AoD), downlink time difference of arrival (DL-TDOA), uplink time difference of arrival (UL-TDOA), enhanced cell ID (E-CID), or a RAT-independent positioning technique (e.g., GNSS).

According to certain example embodiments, as part of the CFO estimation, multiple UEs may be configured to report the estimation of residual TX CFO, and the network may corroborate reports to estimate a reliable TX CFO estimate. For example, multiple UEs that have location knowledge may already be capable of RX CFO compensation, and can therefore estimate the residual TX CFO. In addition, the network may corroborate the reported values or weigh them to determine a final estimated TX CFO that may be signaled to other target UEs as show in FIG. 3.

Figure 4:
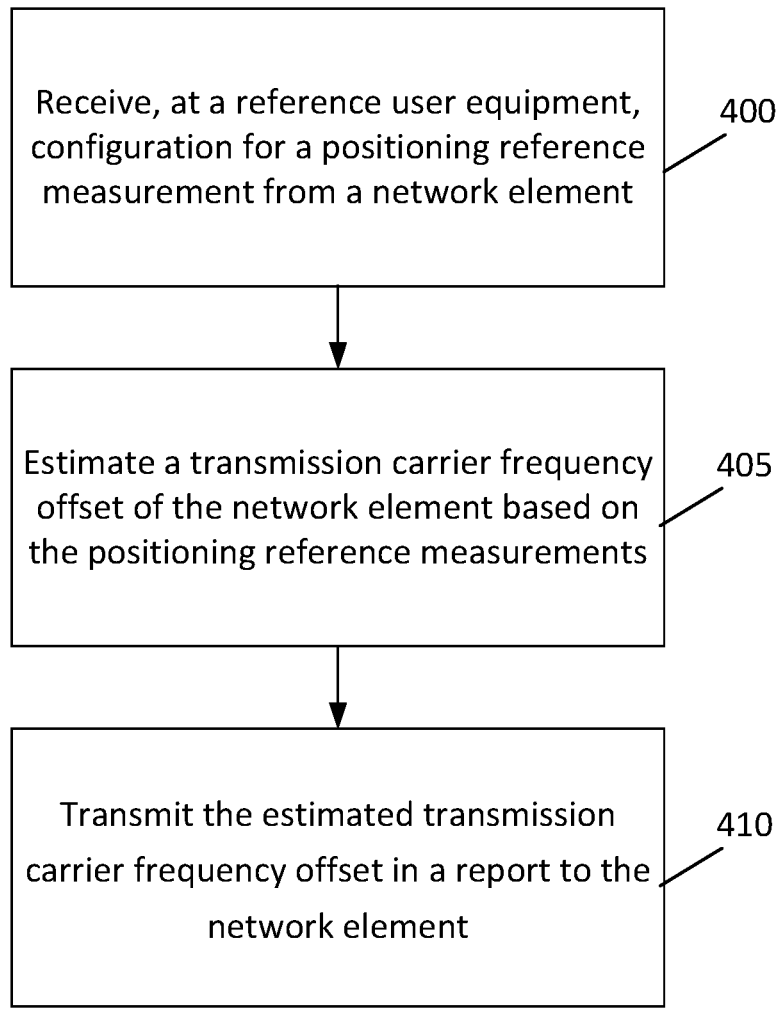
FIG. 4 illustrates an example flow diagram of a method, according to certain example embodiments.

FIG. 4 illustrates an example flow diagram of a method, according to certain example embodiments. In an example embodiment, the method of FIG. 4 may be performed by a network entity, network node, or a group of multiple network elements in a 3GPP system, such as LTE or 5G-NR. For instance, in an example embodiment, the method of FIG. 4 may be performed by a UE including, for example, a reference UE similar to apparatus 10 illustrated in FIG. 7(*a*).

According to certain example embodiments, the method of FIG. 4 may include, at 400, receiving, at a reference user equipment, configuration for a positioning reference measurement from a network element. At 405, the method may include estimating a transmission carrier frequency offset of the network element based on the positioning reference measurements. According to certain example embodiments, estimation of the transmission carrier frequency offset of the network element may also be based on known location of the user equipment and known location of the network element. At 410, the method may include transmitting the estimated transmission carrier frequency offset in a report to the network element.

According to certain example embodiments, the positioning reference measurement may be a carrier aggregation positioning reference measurement between a plurality of carriers. According to other example embodiments, the method may also include signaling to the network element, a capability signaling. In certain example embodiments, the capability signaling may include a capability bit informing the network element of a support of carrier frequency offset compensation in carrier aggregation positioning, or a reporting on a level of carrier frequency offset compensation to be performed. According to further example embodiments, the transmission carrier frequency offset may relate to a position reference transmission by the network element.

Figure 5:
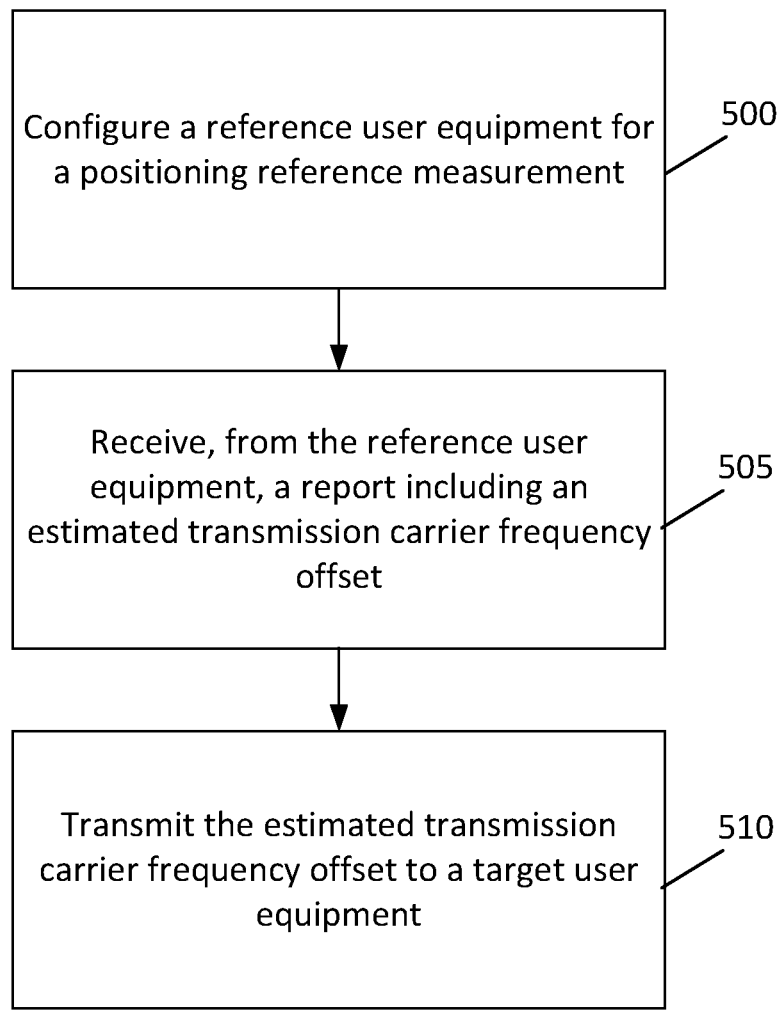
FIG. 5 illustrates an example flow diagram of another method, according to certain example embodiments.

FIG. 5 illustrates an example flow diagram of another method, according to certain example embodiments. In an example embodiment, the method of FIG. 5 may be performed by a network entity, network node, or a group of multiple network elements in a 3GPP system, such as LTE or 5G-NR. For instance, in an example embodiment, the method of FIG. 5 may be performed by a LMF, for instance similar to apparatus 20 illustrated in FIG. 7(*b*).

According to certain example embodiments, the method of FIG. 5 may include, at 500, configuring a reference user equipment for a positioning reference measurement. According to certain example embodiments, configuration of the reference user equipment may also include location of the location management function known location of the user equipment and known location of the network element. At 505, the method may include receiving, from the reference user equipment, a report including an estimated transmission carrier frequency offset. At 510, the method may include transmitting the estimated transmission carrier frequency offset to a target user equipment.

According to certain example embodiments, the method may also include receiving a capability signaling from the reference user equipment. In certain example embodiments, the capability signaling may include a capability bit informing the network element of a support of carrier frequency offset compensation in carrier aggregation positioning, or a reporting on a level of carrier frequency offset compensation to be performed. According to other example embodiments, the method may further include determining a suitable positioning technique for meeting individual positioning quality of service based on the capability signaling. In some example embodiments, the method may also include determining a carrier to be configured to the reference user equipment based on the capability signaling. In other example embodiments, the method may further include determining another carrier to be configured to another user equipment for positioning based on the estimated transmission carrier frequency offset. According to some example embodiments, the method may also include receiving a plurality of reports from a plurality of reference user equipment, and corroborating the plurality of reports to estimate the transmission carrier frequency offset.

Figure 6:
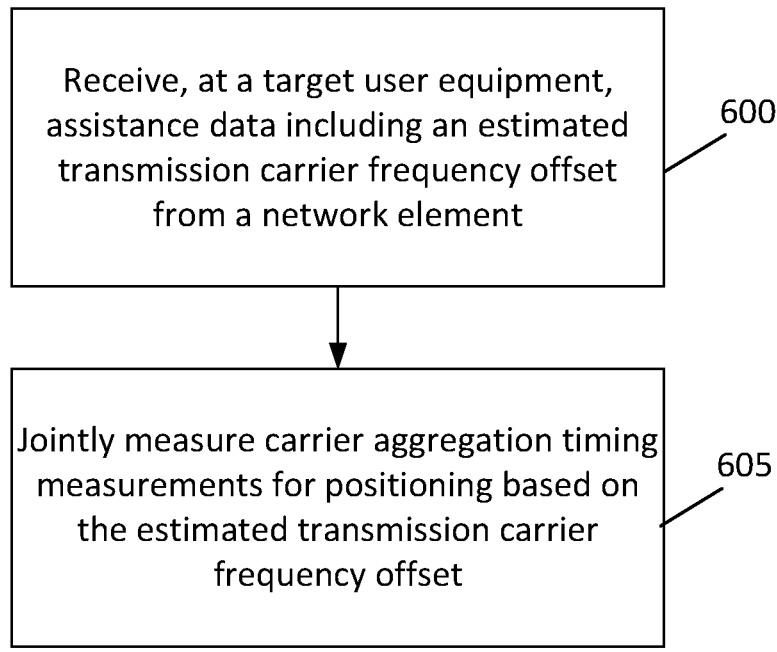
FIG. 6 an example flow diagram of another method, according to certain example embodiments.

FIG. 6 illustrates an example flow diagram of a further method, according to certain example embodiments. In an example embodiment, the method of FIG. 6 may be performed by a network entity, network node, or a group of multiple network elements in a 3GPP system, such as LTE or 5G-NR. For instance, in an example embodiment, the method of FIG. 6 may be performed by a UE including, for example, a target UE similar to apparatus 10 illustrated in FIG. 7(*a*).

According to certain example embodiments, the method of FIG. 5 may include, at 600, receiving, at a target user equipment, assistance data including an estimated transmission carrier frequency offset from a network element. At 605, the method may also include jointly measuring carrier aggregation timing measurements for positioning based on the estimated transmission carrier frequency offset.

According to certain example embodiments, the method may also include pre-compensating a future uplink transmission using the estimated transmission carrier frequency offset. According to further example embodiments, the target user equipment may be configured for position reference signal measurement in carrier aggregation mode. According to other example embodiments, the estimated transmission carrier frequency offset may be received in assistance data, or in a corroborated report derived from a plurality of reports of a plurality of estimated transmission carrier frequency offsets. According to further example embodiments, the method may also include applying the estimated transmission carrier frequency offset as part of a timing measurement procedure on a position reference signal in carrier aggregation mode. In certain example embodiments, the method may further include receiving a weighted report of a plurality of estimated transmission carrier frequency offsets.

FIG. 7(*a*) illustrates an apparatus 10 according to certain example embodiments. In certain example embodiments, apparatus 10 may be a node or element in a communications network or associated with such a network, such as a UE (e.g., reference UE or target UE), mobile equipment (ME), mobile station, mobile device, stationary device, or other device. It should be noted that one of ordinary skill in the art would understand that apparatus 10 may include components or features not shown in FIG. 7(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 7(a).

Figure 7A:
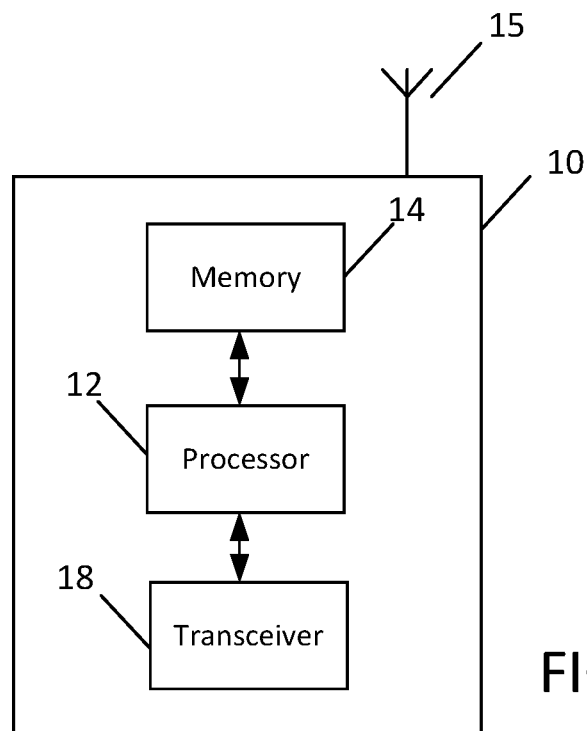
FIG. 7(a) illustrates an apparatus, according to certain example embodiments.

As illustrated in the example of FIG. 7(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-4 and 6.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in, or described with respect to, FIGS. 1-4 and 6, or any other method described herein.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive configuration for a positioning reference measurement from a network element. Apparatus 10 may also be controlled by memory 14 and processor 12 to estimate a transmission carrier frequency offset of the network element based on the positioning reference measurements. Apparatus 10 may further be controlled by memory 14 and processor 12 to transmit the estimated transmission carrier frequency offset in a report to the network element.

In other example embodiments, apparatus 10 may be controlled by memory 14 and processor 12 to receive assistance data including an estimated transmission carrier frequency offset from a network element. Apparatus 10 may also be controlled by memory 14 and processor 12 to jointly measure carrier aggregation timing measurements for positioning based on the estimated transmission carrier frequency offset.

Figure 7B:
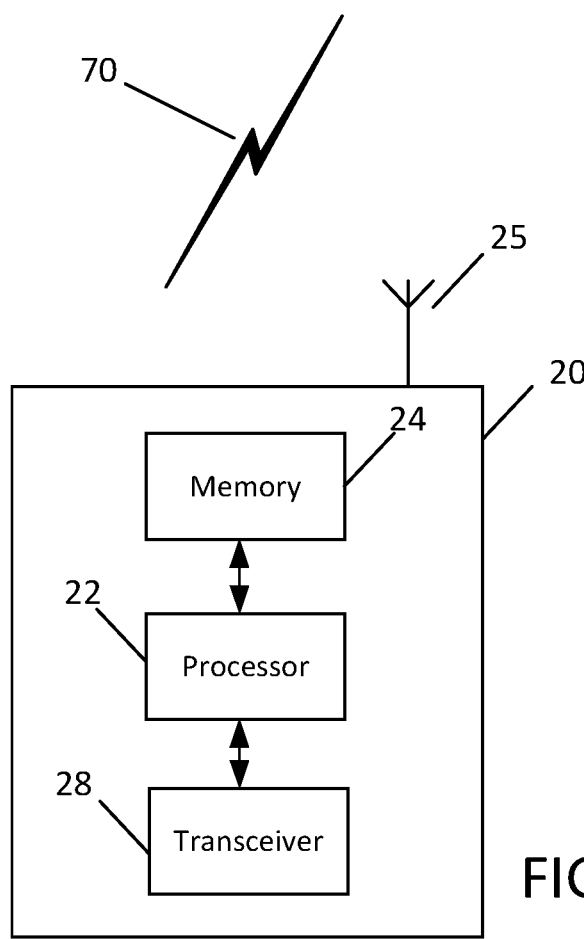
FIG. 7(b) illustrates another apparatus, according to certain example embodiments.

FIG. 7(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), NM, LMF, and/or WLAN access point, associated with a radio access network (RAN), such as an LTE network, 5G or NR. It should be noted that one of ordinary skill in the art would understand that apparatus 20 may include components or features not shown in FIG. 7(b).

As illustrated in the example of FIG. 7(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-3 and 5.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in, or described with respect to, FIGS. 1-3 and 5, or any other method described herein.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In other example embodiments, apparatus 20 may be controlled by memory 24 and processor 22 to configure a reference user equipment for a positioning reference measurement. Apparatus 20 may also be controlled by memory 24 and processor 22 to receive, from the reference user equipment, a report including an estimated transmission carrier frequency offset. Apparatus 20 may further be controlled by memory 24 and processor 22 to transmit the estimated transmission carrier frequency offset to a target user equipment.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving configuration for a positioning reference measurement from a network element. The apparatus may also include means for estimating a transmission carrier frequency offset of the network element based on the positioning reference measurements. The apparatus may further include means for transmitting the estimated transmission carrier frequency offset in a report to the network element.

Other example embodiments may be directed to an apparatus that includes means for configuring a reference user equipment for a positioning reference measurement. The apparatus may also include means for receiving, from the reference user equipment, a report including an estimated transmission carrier frequency offset. The apparatus may further include means for transmitting the estimated transmission carrier frequency offset to a target user equipment.

Other example embodiments may be directed to an apparatus that includes means for receiving assistance data including an estimated transmission carrier frequency offset from a network element. The apparatus may also include means for jointly measuring carrier aggregation timing measurements for positioning based on the estimated transmission carrier frequency offset.

Certain example embodiments described herein provide several technical improvements, enhancements, and/or advantages. In some example embodiments, it may be possible to achieve higher positioning accuracy through better timing estimation. It may also be possible to improve RX CFO estimation accuracy.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
BS Base Station
CFO Carrier Frequency Offset
CIR Channel Impulse Response
DFT Discrete Fourier Transform
DL Downlink
eNB Enhanced Node B
gNB 5G or Next Generation NodeB
I.I.D Independent Identically Distributed
LMF Location Management Function
LPP LTE Positioning Protocol
LTE Long Term Evolution
NR New Radio
PRS Positioning Reference Signals
SNR Signal to Noise Ratio
TOA Time of Arrival
TRP Transmit Receive Point
UE User Equipment

We claim:
1. An apparatus, comprising:
at least one processor; and
at least one memory comprising computer program code,
the at least one memory and the computer program code are configured, with the at least one processor, to cause the apparatus at least to
receive configuration for a positioning reference measurement from a network element on a plurality of positioning frequency layers, wherein the plurality of positioning frequency layers are associated with a same network element;

estimate a transmission carrier frequency offset between a plurality of carriers of the network element based on the positioning reference measurement; and transmit the estimated transmission carrier frequency offset in a report to the network element.

2. The apparatus according to claim 1, wherein the positioning reference measurement is a carrier aggregation positioning reference measurement between a plurality of carriers.

3. The apparatus according to claim 1, wherein the at least one memory and the computer program code are further configured, with the at least one processor, to cause the apparatus at least to:

signal to the network element, a capability signaling, wherein the capability signaling comprises a capability bit informing the network element of a support of carrier frequency offset compensation in carrier aggregation positioning, or a reporting on a level of carrier frequency offset compensation to be performed.

4. The apparatus according to claim 1, wherein the transmission carrier frequency offset relates to a position reference transmission by the network element.

5. An apparatus, comprising:
at least one processor; and
at least one memory comprising computer program code,
the at least one memory and the computer program code are configured, with the at least one processor, to cause the apparatus at least to
configure a reference user equipment for a positioning reference measurement on a plurality of positioning frequency layers, wherein the plurality of positioning frequency layers are associated with a same network element;
receive, from the reference user equipment, a report comprising an estimated transmission carrier frequency offset; and
transmit the estimated transmission carrier frequency offset to a target user equipment.

6. The apparatus according to claim 5, wherein the at least one memory and the computer program code are further configured, with the at least one processor, to cause the apparatus at least to:
receive a capability signaling from the reference user equipment,
wherein the capability signaling comprises
a capability bit informing the network element of a support of carrier frequency offset compensation in carrier aggregation positioning, or
a reporting on a level of carrier frequency offset compensation to be performed.

7. The apparatus according to claim 6, wherein the at least one memory and the computer program code are further configured, with the at least one processor, to cause the apparatus at least to:
determine a suitable positioning technique for meeting individual positioning quality of service based on the capability signaling.

8. The apparatus according to claim 6, wherein the at least one memory and the computer program code are further configured, with the at least one processor, to cause the apparatus at least to:
determine a carrier to be configured to the reference user equipment based on the capability signaling.

9. The apparatus according to claim 5, wherein the at least one memory and the computer program code are further configured, with the at least one processor, to cause the apparatus at least to:
determine another carrier to be configured to another user equipment for positioning based on the estimated transmission carrier frequency offset.

10. The apparatus according to claim 5, wherein the at least one memory and the computer program code are further configured, with the at least one processor, to cause the apparatus at least to:
receive a plurality of reports from a plurality of reference user equipment; and
corroborate the plurality of reports to estimate the transmission carrier frequency offset.

11. An apparatus, comprising:
at least one processor; and
at least one memory comprising computer program code,
the at least one memory and the computer program code are configured, with the at least one processor, to cause the apparatus at least to
receive, from a network element, assistance data comprising an estimated transmission carrier frequency offset, wherein the estimated transmission carrier frequency offset is estimated based on a configuration from the network element for a positioning reference measurement on a plurality of positioning frequency layers, and wherein the plurality of positioning frequency layers are associated with a same network element; and
jointly measure carrier aggregation timing measurements for positioning based on the estimated transmission carrier frequency offset and an estimated reception carrier frequency offset.

12. The apparatus according to claim 11, wherein the at least one memory and the computer program code are further configured, with the at least one processor, to cause the apparatus at least to:
pre-compensate a future uplink transmission using the estimated transmission carrier frequency offset.

13. The apparatus according to claim 11, wherein the apparatus is configured for position reference signal measurement in carrier aggregation mode.

14. The apparatus according to claim 11, wherein the estimated transmission carrier frequency offset is received
in assistance data, or
in a corroborated report derived from a plurality of reports of a plurality of estimated transmission carrier frequency offsets.

15. The apparatus according to claim 11, wherein the at least one memory and the computer program code are further configured, with the at least one processor, to cause the apparatus at least to:
receive a weighted report of a plurality of estimated transmission carrier frequency offsets.

16. A method, comprising:
receiving, at a reference user equipment, configuration for a positioning reference measurement from a network element on a plurality of positioning frequency layers, wherein the plurality of positioning frequency layers are associated with a same network element;
estimating a transmission carrier frequency offset between a plurality of carriers of the network element based on the positioning reference measurements; and
transmitting the estimated transmission carrier frequency offset in a report to the network element.

17. A method, comprising:
- configuring a reference user equipment for a positioning reference measurement on a plurality of positioning frequency layers, wherein the plurality of positioning frequency layers are associated with a same network element;
- receiving, from the reference user equipment, a report comprising an estimated transmission carrier frequency offset; and
- transmitting the estimated transmission carrier frequency offset to a target user equipment.

18. A method, comprising:
- receiving, at a target user equipment, assistance data comprising an estimated transmission carrier frequency offset from a network element, wherein the estimated transmission carrier frequency offset is estimated based on a configuration from the network element for a positioning reference measurement on a plurality of positioning frequency layers, and wherein the plurality of positioning frequency layers are associated with a same network element; and
- jointly measuring carrier aggregation timing measurements for positioning based on the estimated transmission carrier frequency offset and an estimated reception carrier frequency offset.

* * * * *